(12) United States Patent
Arimilli et al.

(10) Patent No.: US 7,017,024 B2
(45) Date of Patent: Mar. 21, 2006

(54) DATA PROCESSING SYSTEM HAVING NO SYSTEM MEMORY

(75) Inventors: Ravi Kumar Arimilli, Austin, TX (US); John Steven Dodson, Pflugerville, TX (US); Sanjeev Ghai, Round Rock, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 10/319,023

(22) Filed: Dec. 12, 2002

(65) Prior Publication Data

US 2004/0117591 A1   Jun. 17, 2004

(51) Int. Cl.
    *G06F 12/10* (2006.01)
(52) U.S. Cl. .................. 711/202; 711/104; 711/111; 711/112; 711/113
(58) Field of Classification Search ........ 711/202–203, 711/206, 221, 205, 207, 104, 111–113
See application file for complete search history.

(56) References Cited

U.S. PATENT DOCUMENTS

| | | | | |
|---|---|---|---|---|
| 4,747,044 A | * | 5/1988 | Schmidt et al. ............. | 711/202 |
| 4,974,167 A | * | 11/1990 | Anderson et al. ............. | 702/68 |
| 4,982,402 A | * | 1/1991 | Beaven et al. ................. | 714/15 |
| 5,193,184 A | * | 3/1993 | Belsan et al. .................. | 711/4 |
| 5,247,638 A | * | 9/1993 | O'Brien et al. ............... | 710/68 |
| 5,394,537 A | * | 2/1995 | Courts et al. ................ | 711/202 |
| 5,497,355 A | * | 3/1996 | Mills et al. ............ | 365/230.08 |

(Continued)

OTHER PUBLICATIONS

B. Jacob, *Segmented Addressing Solves the Virtual Cache Synonym Problem*, Technical Report UMD-ECAL-97-01, University of Maryland, 1997, pp. 1-10.

(Continued)

*Primary Examiner*—Hetul Patel
(74) *Attorney, Agent, or Firm*—Casimer K. Salys; Dillon & Yudell LLP (57) ABSTRACT

A data processing system having no system memory is disclosed. The data processing system includes multiple processing units. The processing units have volatile cache memories operating in a virtual address space that is greater than a real address space. The processing units and the respective volatile memories are coupled to a storage controller operating in a physical address space that is equal to the virtual address space. The processing units and the storage controller are coupled to a hard disk via an interconnect. The storage controller allows the mapping of a virtual address from one of the volatile cache memories to a physical disk address directed to a storage location within the hard disk without transitioning through a real address.

4 Claims, 8 Drawing Sheets

U.S. PATENT DOCUMENTS

| | | | |
|---|---|---|---|
| 5,809,566 A | 9/1998 | Charney et al. | 711/213 |
| 6,061,774 A * | 5/2000 | Witek | 711/210 |
| 6,098,151 A | 8/2000 | Tsuchida | 711/133 |
| 6,262,995 B1 | 7/2001 | Kwak | 370/469 |
| 6,317,815 B1 * | 11/2001 | Mayer et al. | 711/165 |
| 6,341,325 B1 * | 1/2002 | Franaszek et al. | 711/3 |
| 6,438,663 B1 * | 8/2002 | Agarwal et al. | 711/148 |
| 6,493,811 B1 | 10/2002 | Blades et al. | 711/203 |
| 6,523,096 B1 | 2/2003 | Sanada et al. | 711/152 |
| 6,795,897 B1 * | 9/2004 | Benveniste et al. | 711/118 |
| 2003/0033479 A1 | 2/2003 | Gruner et al. | 711/118 |
| 2004/0068680 A1 * | 4/2004 | Mohammad | 714/42 |
| 2005/0125593 A1 * | 6/2005 | Karpoff et al. | 711/4 |

OTHER PUBLICATIONS

Lai et al., *A Memory Management Unit and Cache Controller for the MARS System*, Microprogramming and Microarchitecture; Micro 23; Proceedings of the 23$^{rd}$ Annual Workshop and Symposium, Workshop on Nov. 27-29, 1990; pp. 200-208.

Khalidi et al., *Virtual Memory Support for Multiple Page Sizes*; Workstation Operating Systems, 1993; Proceedings, Fourth Workshop on, Oct. 14-15, 1993; pp. 104-109.

* cited by examiner

Aliasing Table 60

| 61 Virtual Address-A | 62 Virtual Address-B | 63 V |
|---|---|---|
| Virtual Address-A | Virtual Address-C | V |
| Virtual Address-D | Virtual Address-E | V |
| Virtual Address-X | Virtual Address-Y | V |
| ⋮ | ⋮ | |
| | | |
| | | |
| | | |

| 36 Virtual Address 1 | 37 Physical Address 1 | 38 V |
|---|---|---|
| Virtual Address 2 | Physical Address 2 | V |
| Virtual Address 3 | Physical Address 3 | V |
| Virtual Address 4 | Physical Address 4 | V |
| ⋮ | ⋮ | |
| | | |
| | | |
| | | |

DATA PROCESSING SYSTEM HAVING NO SYSTEM MEMORY

BACKGROUND OF THE INVENTION

1. Technical Field

The present invention relates to a data processing system in general, and in particular to a data processing system having a memory hierarchy. Still more particularly, the present invention relates to a data processing system capable of managing a virtual memory processing scheme without any assistance from an operating system.

2. Description of the Related Art

A prior art memory hierarchy typically includes one or more levels of cache memories, a system memory (also referred to as a real memory), and a hard disk (also referred to as a physical memory) connected to a processor complex via an input/output channel converter. When there are multiple levels of cache memories, the first level cache memory, commonly known as the level one (L1) cache, has the fastest access time and the highest cost per bit. The remaining levels of cache memories, such as level two (L2) caches, level three (L3) caches, etc., have a relatively slower access time, but also a relatively lower cost per bit. It is quite common that each lower cache memory level has a progressively slower access time.

The system memory is typically used to hold the most often used portions of process address space for a data processing system that employs a virtual memory processing scheme. Other portions of process address space are stored on the hard disk and will be retrieved as needed. During the execution of a software application, the operating system translates virtual addresses to real addresses. With the assistance of a Page Frame Table (PFT) stored within the system memory, the translation occurs at the granularity of pages of storage. A processor cache usually includes a translation lookaside buffer (TLB) that acts as a cache for the most recently used PFT entries (PTEs).

When a data load, data store, or instruction fetch request is initiated, a virtual address of the data associated with the request is looked up in the TLB to find a PTE that contains the corresponding real address for the virtual address. If the PTE is found in the TLB, the data load, data store, or instruction fetch request is issued to the memory hierarchy with the corresponding real address. If the PTE is not found in the TLB, the PFT within the system memory is utilized to locate the corresponding PTE. The PTE is then reloaded into the TLB and the translation process restarts.

Because of space constraints, not all virtual addresses can be fit into the PFT within the system memory. If a virtual-to-real address translation cannot be found in the PFT, or if the translation is found but the data associated with that page is not resided in the system memory, a page fault will occur to interrupt the translation process so that the operating system can update the PFT for a new translation. Such an update involves the moving of the page to be replaced from the system memory to the hard disk, invalidating all copies of the replaced PTE in the TLBs of all processors, moving the page of data associated with the new translation from the hard disk to the system memory, updating the PFT, and restarting the translation process.

As mentioned above, the management of virtual memories is typically performed by the operating system, and the portion of the operating system that manages the PFT and the paging of data between the system memory and the hard disk is commonly called the Virtual Memory Manager (VMM). However, there are several problems associated with the virtual memories being managed by the operating system. For example, the VMM is usually ignorant of the hardware structure and hence the replacement polices dictated by the VMM are generally not very efficient. In addition, the VMM code is very complex and expensive to maintain across multiple hardware platforms or even a single hardware platform that has many different possible memory configurations. The present disclosure provides a solution to the above-mentioned problems.

SUMMARY OF THE INVENTION

In accordance with a preferred embodiment of the present invention, a data processing system capable of utilizing a virtual memory processing scheme includes multiple processing units. The processing units have volatile cache memories operating in a virtual address space that is greater than a real address space. The processing units and the respective volatile memories are coupled to a storage controller operating in a physical address space that is equal to the virtual address space. The processing units and the storage controller are coupled to a hard disk via an interconnect. The storage controller allows the mapping of a virtual address from one of the volatile cache memories to a physical disk address directed to a storage location within the hard disk without transitioning through a real address.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

For the purpose of illustration, the present invention is demonstrated by using a multiprocessor data processing system having a single level of cache memory. It should be understood that the features of the present invention may be applicable to data processing systems having multiple levels of cache memory.

I. Prior Art

Figure 1:
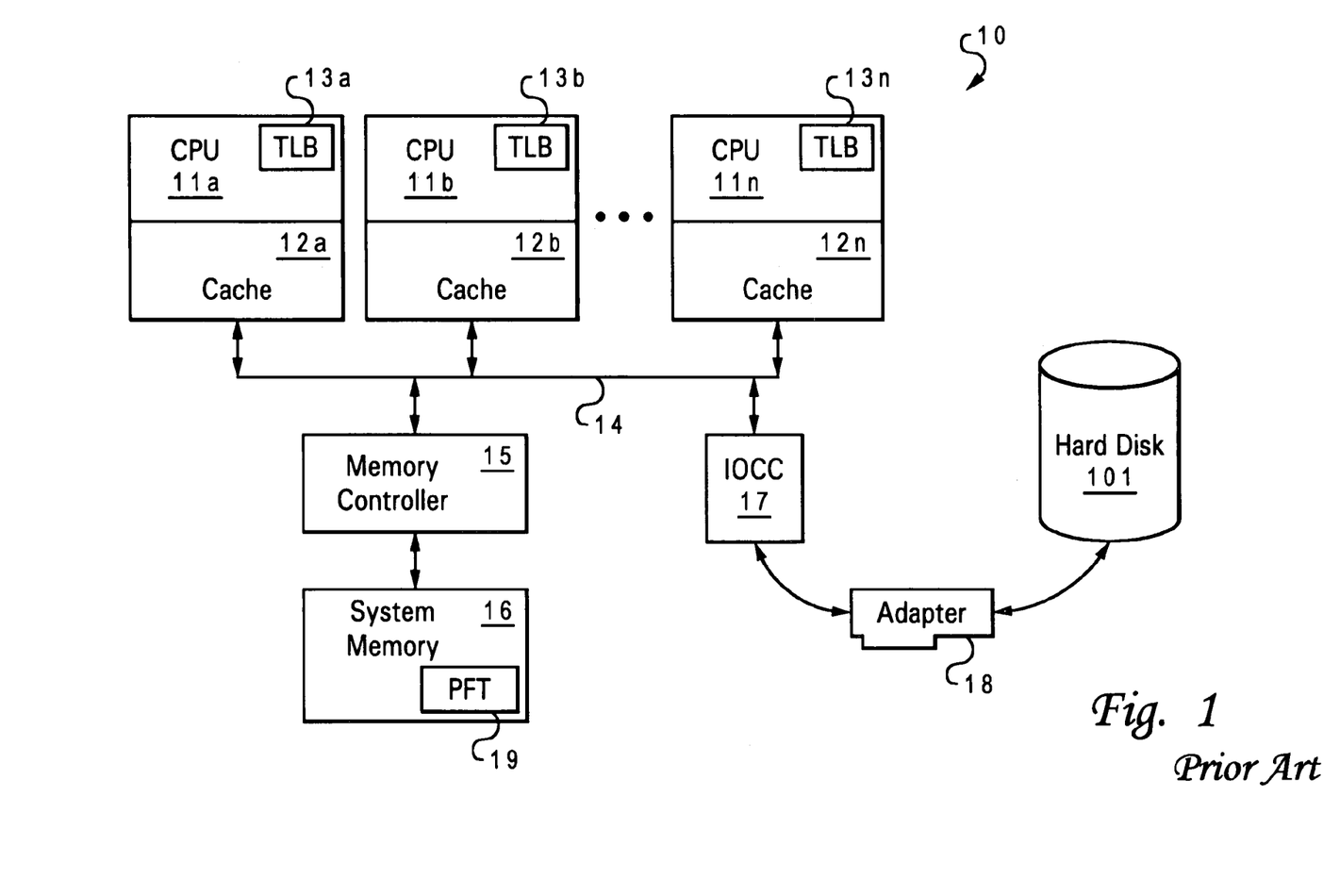
FIG. 1 is a block diagram of a multiprocessor data processing system according to the prior art.

Referring now to the drawings and, in particular, to FIG. 1, there is depicted a block diagram of a multiprocessor data processing system, according to the prior art. As shown, a multiprocessor data processing system 10 includes multiple central processing units (CPUs) 11a–11n, and each of CPUs 11a–11n contains a cache memory. For example, CPU 11a contains a cache memory 12a, CPU 11b contains a cache memory 12b, and CPU 11n contains a cache memory 12n. CPUs 11a–11n and cache memories 12a–12n are coupled to a memory controller 15 and a system memory 16 via an interconnect 14. Interconnect 14 serves as a conduit for communication transactions between cache memories 12a–12n and an input/output channel converter (IOCC) 17.

Multiprocessor data processing system 10 employs a virtual memory processing scheme, which means three types of addresses are being used concurrently. The three types of addresses are virtual addresses, real addresses, and physical addresses. A virtual address is defined as an address referenced directly in a software application within a data processing system that utilizes a virtual memory processing scheme. A real address is defined as an address referenced when a system memory (or main memory) within a data processing system is to be accessed. A physical address is defined as an address referenced when a hard disk within a data processing system is to be accessed.

Under the virtual memory processing scheme, an operating system translates virtual addresses used by CPU 11a–11n to corresponding real addresses used by system memory 16 and cache memories 12a–12n. A hard disk adapter 18, under the control of its device driver software, translates real addresses used by system memory 16 and cache memories 12a–12n to physical addresses (or disk addresses) used by a hard disk 101.

During operation, system memory 16 holds the most often used portions of process data and instructions while the remaining portions of process data and instructions are stored on hard disk 101. A Page Frame Table (PFT) 19 stored in system memory 16 is used to define the mapping of virtual addresses to real addresses. Each of translation lookaside buffers (TLBs) 13a–13n within a corresponding CPU acts as a cache for the most recently used PFT entries (PTEs).

If a virtual-to-real address translation is not found in PFT 19, or if the virtual-to-real translation is found but the associated data do not reside in system memory 16, a page fault will occur to interrupt the translation process so that the operating system has to update PFT 19 and/or transfer the requested data from hard disk 101 to system memory 16. A PFT update involves the moving of the page to be replaced from system memory 16 to hard disk 101, invalidating all copies of the replaced PTE in TLBs 13a–13n, moving the page of data associated with the new translation from hard disk 101 into system memory 16, updating PFT 19, and restarting the translation process. The handling of page fault is conventionally controlled by the operating system, and such an arrangement has deficiencies as mentioned previously.

II. New Configurations

In accordance with a preferred embodiment of the present invention, system memory 16 in FIG. 1 is completely eliminated from data processing system 10. Because system memory 16 is completely eliminated from the data processing system, all data and instructions must be fetched directly from a hard disk, and a storage controller is utilized to manage the transfer of data and instructions to and from the hard disk. In essence, the system memory is "virtualized" under the present invention.

In the simplest embodiment of the present invention, no virtual-to-physical address aliasing is allowed. Aliasing is defined as the mapping of more than one virtual address to a single physical address. Because a virtual address always maps to only one physical address when there is no aliasing; thus, no virtual-to-physical address translation is required.

Figure 2:
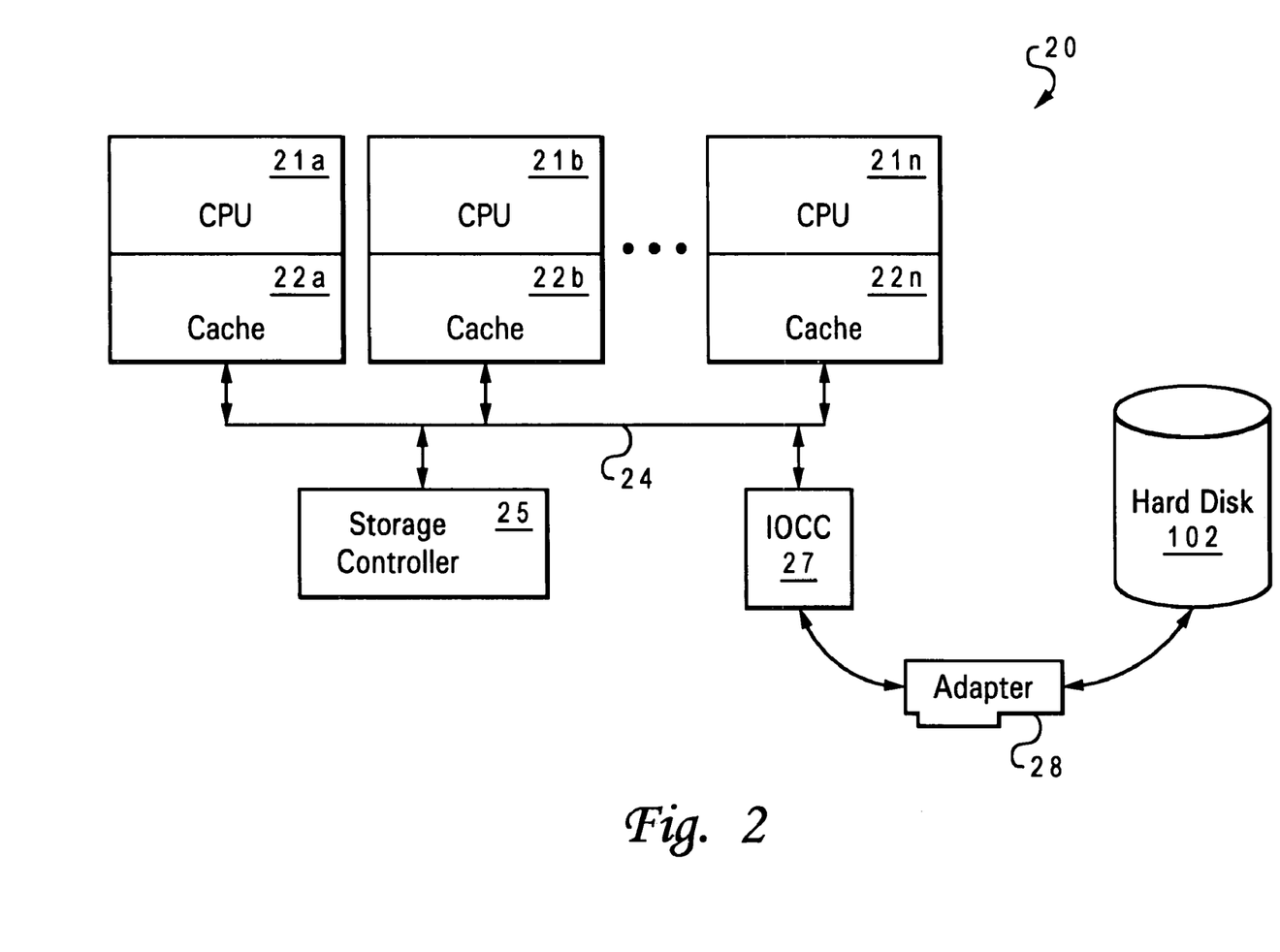
FIG. 2 is a block diagram of a multiprocessor data processing system in which a preferred embodiment of the present invention is incorporated.

With reference now to FIG. 2, there is depicted a block diagram of a multiprocessor data processing system in which a preferred embodiment of the present invention is incorporated. As shown, a multiprocessor data processing system 20 includes multiple central processing units (CPUs) 21a–21n, and each of CPUs 21a–21n contains a cache memory. For example, CPU 21a contains a cache memory 22a, CPU 21b contains a cache memory 22b, and CPU 21n contains a cache memory 22n. CPUs 21a–21n and cache memories 22a–22n are coupled to a storage controller 25 via an interconnect 24. Interconnect 24 serves as a conduit for communicating transactions between cache memories 22a–22n and an IOCC 27. IOCC 27 is coupled to a hard disk 102 via a hard disk adapter 28.

In the prior art (see FIG. 1), hard disk adapter 18 and the device driver software associated with hard disk adapter 18 translates real addresses used by cache memories 22a–22n and system memory 16 to corresponding physical addresses used by hard disk 101. In the present invention, storage controller 25 manages the translation of virtual addresses to corresponding physical addresses (since the traditional real address space has been eliminated). But when aliasing is not allowed, translations of virtual addresses to physical addresses are not required at all because there is a direct one-to-one correspondence between virtual addresses and physical addresses.

In the embodiment of FIG. 2, the size of hard disk 102 dictates the virtual address range of multiprocessor data processing system 20. In other words, the physical address range of hard disk 102 is the same as the virtual address range of multiprocessor data processing system 20. However, a virtual address range that is larger than the physical address range of hard disk 102 can also be defined. In that case, an attempt by software to access a virtual address that is outside the range of the physical address range of hard disk 102 would be considered as an exception and needs to be handled by an exception interrupt. Another method of providing a virtual address range larger than the physical address range of hard disk 102 is by utilizing a virtual-to-physical translation table, such as a virtual-to-physical translation table 29 depicted in FIG. 7.

Figures 3, 5:
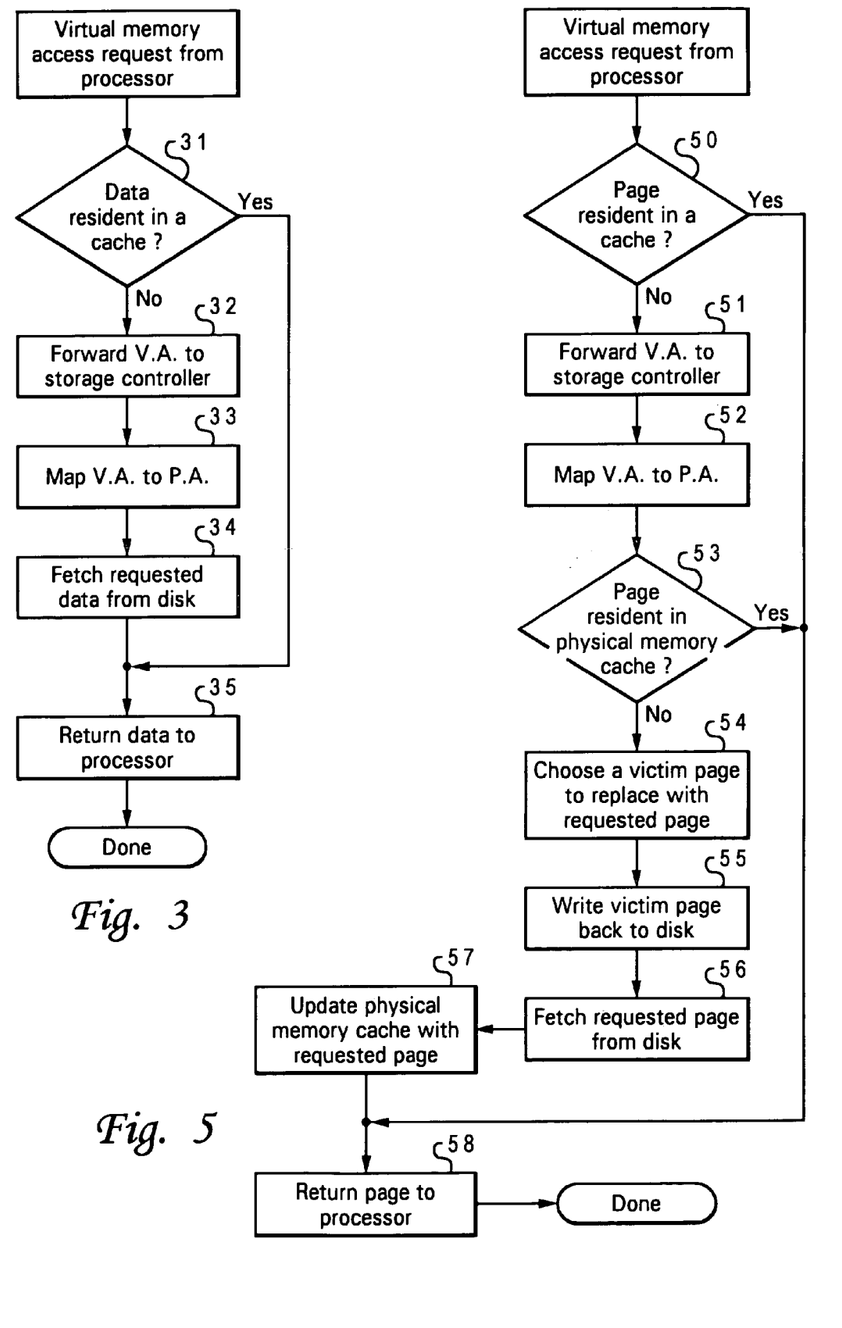
FIG. 3 is a high-level logic flow diagram of a method for handling a virtual memory access request from a processor within the multiprocessor data processing system in FIG. 2.
FIG. 5 is a high-level logic flow diagram of a method for handling a virtual memory access request from a processor within the multiprocessor data processing system in FIG. 4.

Referring now to FIG. 3, there is illustrated a high-level logic flow diagram of a method for handling a virtual memory access request from a processor within multiprocessor data processing system 20, in accordance with a preferred embodiment of the present invention. In response to a virtual memory access request from a processor, a determination is made as to whether or not the requested data from the access request is resident in a cache memory associated with the processor, as shown in block 31. If the requested data is resident in the cache memory associated with the processor, then the requested data is sent from the associated cache memory to the processor, as depicted in block 35. Otherwise, if the requested data is not resident in the cache memory associated with the processor, the virtual address of the requested data is forward to a storage controller, such as storage controller 25 from FIG. 2, as shown in block 32. The virtual address of the requested data is then mapped to a corresponding physical address by the storage controller, as depicted in block 33. Next, the requested data is fetched from a hard disk, such as hard disk 102 from FIG. 2, as shown in block 34, and the requested data is subsequently sent to the processor, as depicted in block 35.

Figure 4:
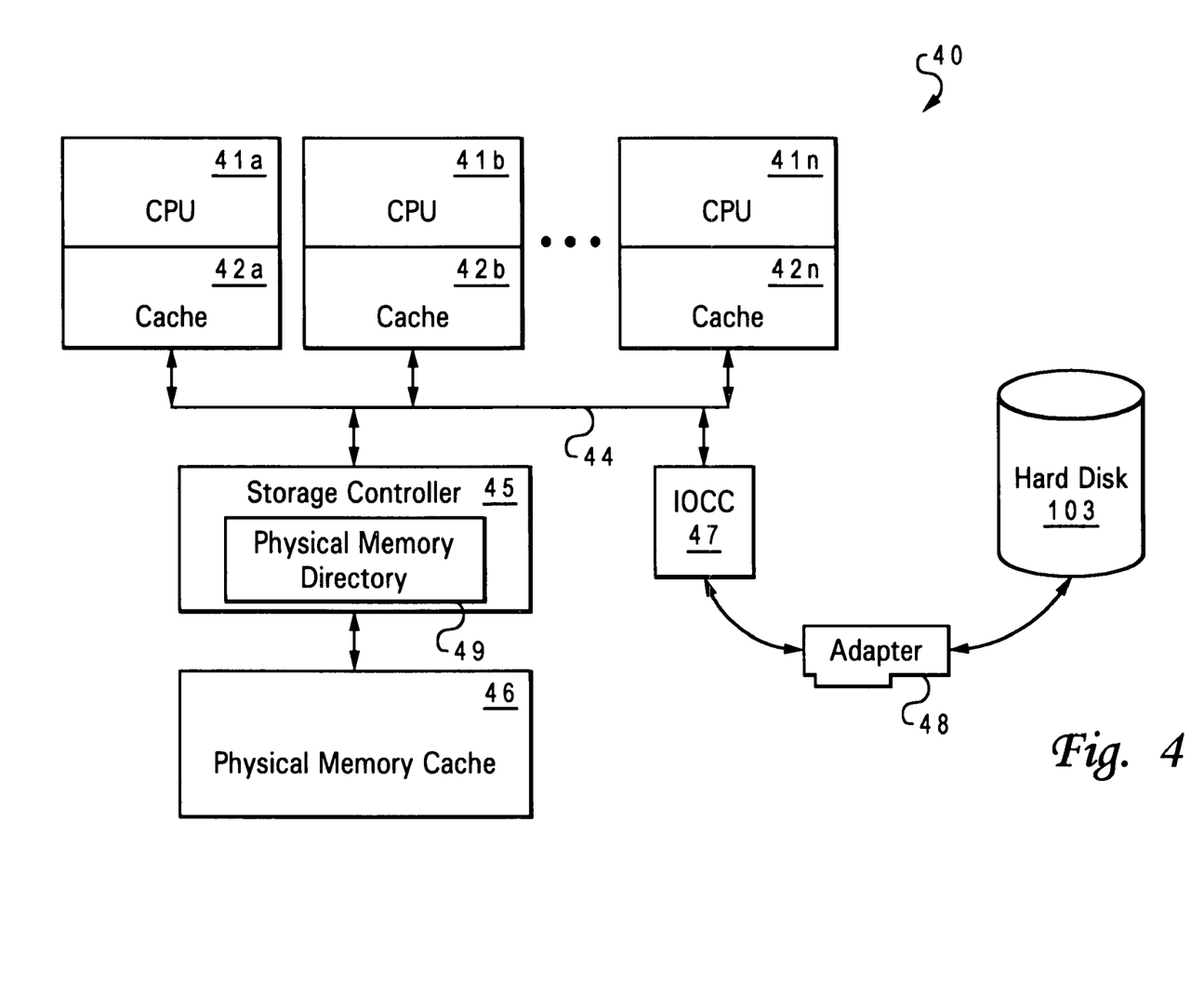
FIG. 4 is a block diagram of a multiprocessor data processing system in which a second embodiment of the present invention is incorporated.

With reference now to FIG. 4, there is depicted a block diagram of a multiprocessor data processing system in which a second embodiment of the present invention is incorporated. As shown, a multiprocessor data processing system 40 includes multiple central processing units (CPUs) 41a–41n, and each of CPUs 41a–41n contains a cache memory. For example, CPU 41a contains a cache memory 42a, CPU 41b contains a cache memory 42b, and CPU 41n contains a cache memory 42n. CPUs 41a–41n and cache memories 42a–42n are coupled to a storage controller 45 and a physical memory cache 46 via an interconnect 44. Physical memory cache 46 is preferably a dynamic random access memory (DRAM) based storage device; however, other similar types of storage device can also be utilized. Storage controller 45 includes a physical memory cache directory 49 for keeping track of physical memory cache 46. Interconnect 44 serves as a conduit for communicating transactions between cache memories 42a–42n and an IOCC 47. IOCC 47 is coupled to a hard disk 103 via a hard disk adapter 48.

Similar to storage controller 25 in FIG. 2, storage controller 45 manages the translation of virtual addresses to corresponding physical addresses (since the traditional real address space has been eliminated). Again, because the physical address range of hard disk 103 is preferably the same as the virtual address range of multiprocessor data processing system 40 and because aliasing is not allowed in multiprocessor data processing system 40, translations of virtual addresses to physical addresses are not required.

Physical memory cache 46 contains a subset of information stored in hard disk 103. The subset of information stored within physical memory cache 46 is preferably the information that are most-recently accessed by any one of CPUs 41a–41n. Each cache line within physical memory cache 46 preferably includes a physical address-based tag and an associated page of data. Although the data granularity of each cache line within physical memory cache 46 is one page, other data granularity may also be utilized. Physical memory cache directory 49 keeps track of physical memory cache 46 by employing any commonly known cache management techniques, such as associativity, coherency, replacement, etc. Each entry in physical memory cache directory 49 preferably represents one or more physical memory pages residing in physical memory cache 46. If there is a "miss" in physical memory cache 46 after a virtual memory access request for a page of data, the requested page of data is fetched from hard disk 103. Additional pages of data can also be fetched from hard disk 103 based on a predetermined algorithm or hints from the virtual memory access request.

Referring now to FIG. 5, there is illustrated a high-level logic flow diagram of a method for handling a virtual memory access request from a processor within multiprocessor data processing system 40, in accordance with a preferred embodiment of the present invention. In response to a virtual memory access request from a processor, a determination is made as to whether or not the requested page of data from the access request is resident in a cache memory associated with the processor, as shown in block 50. If the requested page of data is resident in the cache memory associated with the processor, then the requested page of data is sent from the associated cache memory to the processor, as depicted in block 58. Otherwise, if the requested page of data is not resident in the cache memory associated with the processor, the virtual address of the requested page of data is forward to a storage controller, such as storage controller 45 from FIG. 4, as shown in block 51. The virtual address of the requested page of data is then mapped to a corresponding physical address, as depicted in block 52.

Next, a determination is then made as to whether or not the requested page of data is resident in a physical memory cache, such as physical memory cache 46 from FIG. 4, as depicted in block 53. If the requested page is resident in the physical memory cache, then the requested page of data is sent to the processor from the physical memory cache, as depicted in block 58. Otherwise, if the requested page of data is not resident in the physical memory cache, a "victim" page is chosen within the physical memory cache, as shown in block 54. The "victim" page is then written back to a hard disk, such as hard disk 103 from FIG. 4, as depicted in block 55. The details of writing page of data back to the hard disk are described infra. The requested page of data is fetched from the hard disk, as shown in block 56. Next, the physical memory cache is updated with the requested page of data, as depicted in block 57, and the requested page of data is subsequently sent to the processor, as depicted in block 58.

When the page of data requested by a processor is not stored in physical memory cache 46, storage controller 45 executes the following sequence of steps:

1. First, a "victim" page of data to be replaced with the requested page of data is selected.
2. Storage controller 45 then initiates a burst input/output (I/O) write operation to write the selected "victim" page of data to hard disk 103. Alternatively, storage controller 45 can send a command to hard disk adapter 48 to direct hard disk adapter 48 to initiate a direct memory access (DMA) transfer of the selected "victim" page of data from physical memory cache 46 to hard disk 103.
3. Next, storage controller 45 initiates a burst I/O read operation to fetch the requested page of data from hard disk 103. Alternatively, storage controller 45 can send a command to hard disk adapter 48 to direct hard disk adapter 48 to initiate a DMA transfer of the requested page from hard disk 103 to physical memory cache 46.
4. Storage controller 45 then writes the requested page of data to physical memory cache 46 and returns the requested page of data to the requesting processor.

All of the above steps are performed without any assistance from the operating system software.

III. Aliasing

In order to improve the efficiency of multiprocessor data processing system 40 from FIG. 4 and to allow data sharing between processes, virtual-to-physical address aliasing is permitted. Because more than one virtual address may map to one single physical address when there is virtual address aliasing, virtual-to-physical address translations are required. In accordance with a preferred embodiment of the present invention, an aliasing table is used to support virtual-to-physical address translations.

Figure 6:
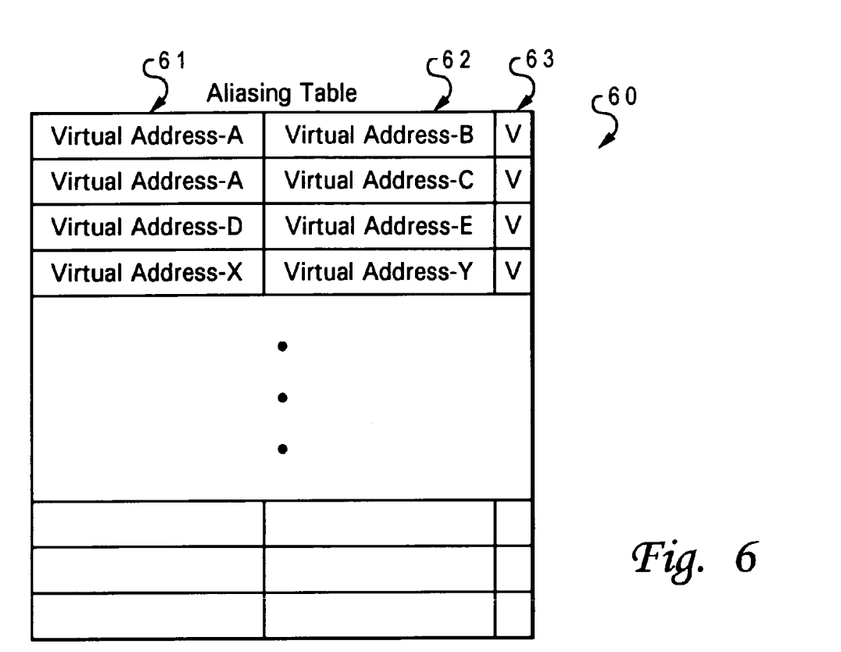
FIG. 6 is a block diagram of an aliasing table in accordance with a preferred embodiment of the present invention.

With reference now to FIG. 6, there is depicted a block diagram of an aliasing table in accordance with a preferred embodiment of the present invention. As shown, each entry of an aliasing table 60 includes three fields, namely, a virtual address field 61, a virtual address field 62 and a valid bit field 63. Virtual address field 61 contains a primary virtual address and virtual address field 62 a secondary virtual address. For each entry within aliasing table 60, both the primary and secondary virtual addresses are mapped to one physical address. Valid bit field 63 indicates whether or not that particular entry is valid.

In order to keep aliasing table 60 down to a reasonable size, any virtual address that is not aliased with another virtual address does not have an entry in aliasing table 60. Aliasing table 60 is searched each time a load/store instruction or an instruction fetch is executed by a processor. If a matching virtual address entry is found in aliasing table 60, the primary virtual address (in virtual address field 61) of the matching entry is forward to the memory hierarchy. For example, if virtual address C in aliasing table 60 is requested, then virtual address A—the primary virtual address for that entry—is forward to the cache memory associated with the requesting processor since both virtual address A and virtual address C point to the same physical address. Thus, as far as the memory hierarchy is concerned, the secondary virtual addresses within aliasing table 60 effectively do not exist.

Figure 7:
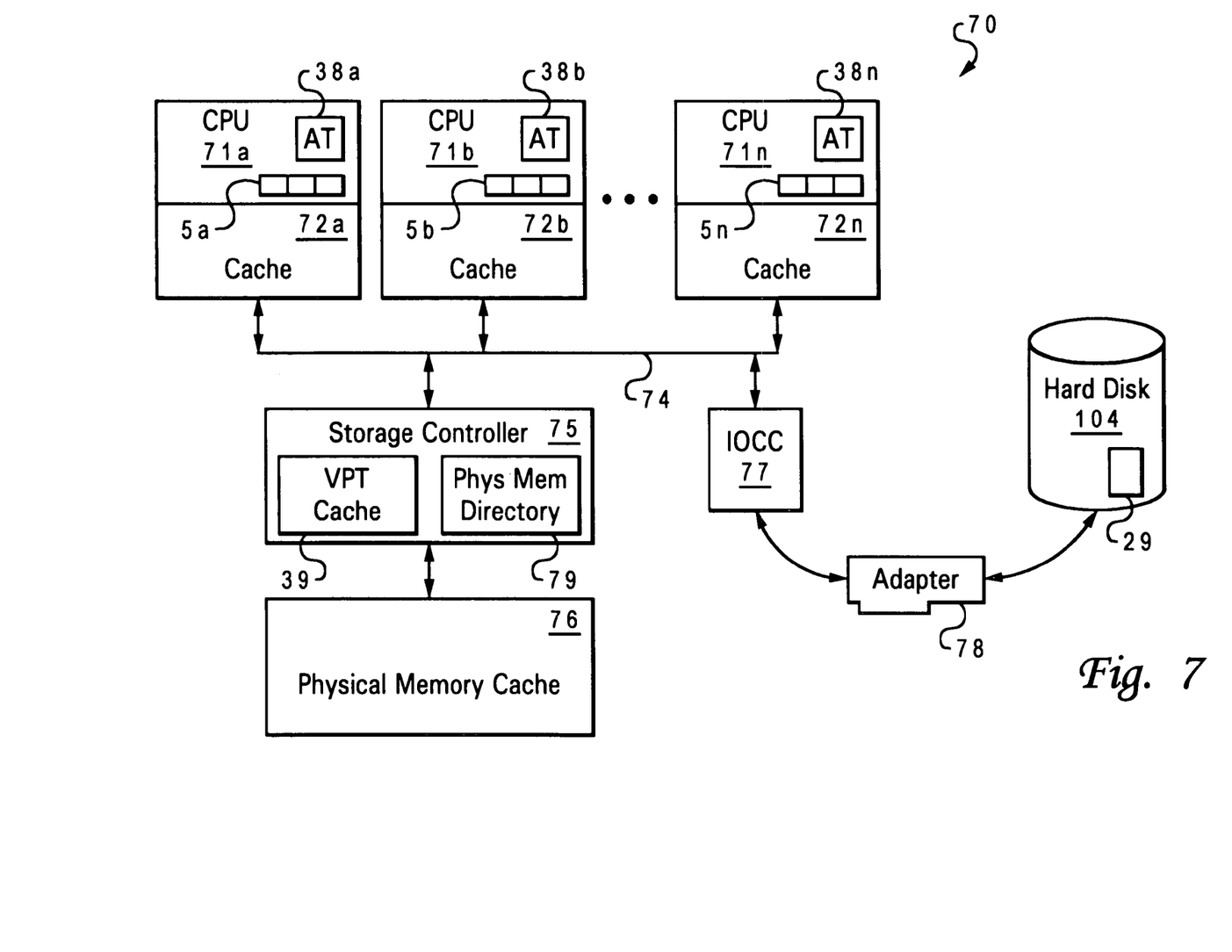
FIG. 7 is a block diagram of a multiprocessor data processing system in which a third embodiment of the present invention is incorporated.

Referring now to FIG. 7, there is depicted a block diagram of a multiprocessor data processing system in which a third embodiment of the present invention is incorporated. As shown, a multiprocessor data processing system 70 includes multiple central processing units (CPUs) 71*a*–71*n*, and each of CPUs 71*a*–71*n* contains a cache memory. For example, CPU 71*a* contains a cache memory 72*a*, CPU 71*b* contains a cache memory 72*b*, and CPU 71*n* contains a cache memory 72*n*. CPUs 71*a*–71*n* and cache memories 72*a*–72*n* are coupled to a storage controller 75 and a physical memory cache 76 via an interconnect 74. Physical memory cache 76 is preferably a DRAM-based storage device but other similar types of storage device may also be utilized. Interconnect 74 serves as a conduit for communicating transactions between cache memories 72*a*–72*n* and an IOCC 77. IOCC 77 is coupled to a hard disk 104 via a hard disk adapter 78.

Virtual-to-physical address aliasing is permitted in multiprocessor data processing system 70. Thus, each of CPUs 71*a*–71*n* includes a respective one of aliasing tables 38*a*–38*n* to assist virtual-to-physical address translations. In addition, a virtual-to-physical translation table (VPT) 29 is provided within hard disk 104 for performing virtual-to-physical (disk) address translations. Specifically, a region of disk space 104 is reserved to contain VPT 29 for the entire virtual address range to be utilized by multiprocessor data processing system 70. The presence of VPT 29 allows the virtual address range of multiprocessor data processing 70 to be larger than the physical address range of hard disk 104. With VPT 29, the operating system is relieved from the burden of managing address translations.

Figure 8:
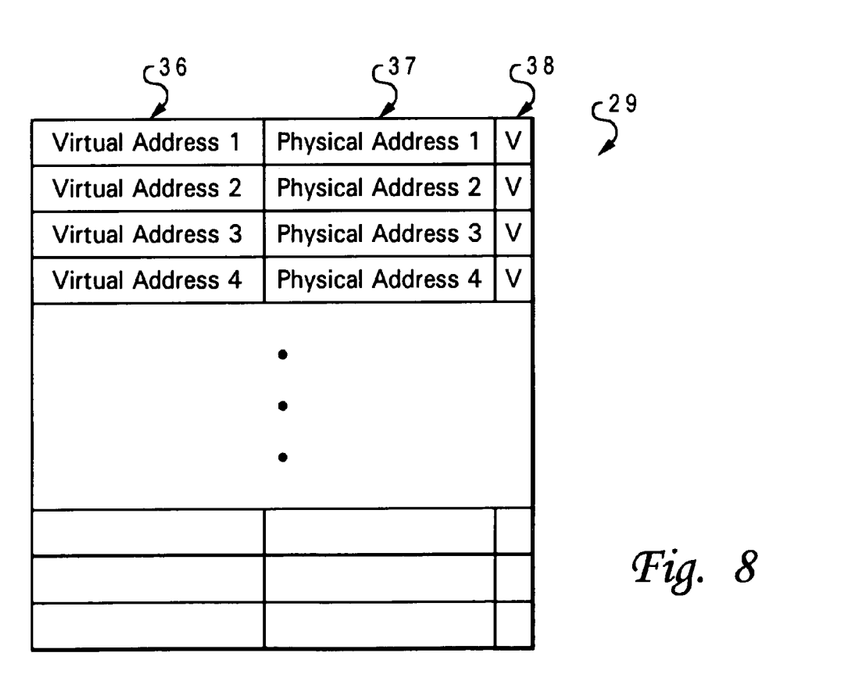
FIG. 8 is a block diagram of a virtual-to-physical address translation table within the multiprocessor data processing system in FIG. 7, in accordance with a preferred embodiment of the present invention.

With reference now to FIG. 8, there is depicted a block diagram of VPT 29, in accordance with a preferred embodiment of the present invention. As shown, each entry of VPT 29 includes three fields, namely, a virtual address field 36, a physical address field 37 and a valid bit field 38. VPT 29 contains an entry for every virtual address used within multiprocessor data processing system 70 (from FIG. 7). For each entry within VPT 29, virtual address field 36 contains a virtual address, physical address field 37 contains a corresponding physical address for the virtual address in virtual address field 36, and valid bit field 63 indicates whether or not that particular entry is valid. If storage controller 75 (from FIG. 7) receives a virtual address access request for a virtual address entry in which valid bit field 38 is not valid, storage controller 75 may perform one of the following two options:

1. send an exception interrupt to the requesting processor (i.e., treat the access request as an error condition; or
2. update the entry with an unused physical address (if available), set valid bit field 38 valid, and continue processing.

Referring back to FIG. 7, storage controller 75 is coupled to a physical memory cache 76. Physical memory cache 76 contains a subset of information stored in hard disk 104. The subset of information stored within physical memory cache 76 is preferably the information that are most-recently accessed by any one of CPUs 71*a*–71*n*. Each cache line within physical memory cache 76 preferably includes a physical address-based tag and an associated page of data. Storage controller 75 also manages the translation of virtual addresses to corresponding physical addresses. Storage controller 75 includes a VPT cache 39 and a physical memory directory 79. VPT cache 39 stores the most-recently used portion of VPT 29 within hard disk 104. Each entry within VPT cache 39 is a VPT entry (corresponding to one of the most-recently used entries from VPT 29). Physical memory cache directory 79 keeps track of physical memory cache 76 by employing any commonly known cache management techniques, such as associativity, coherency, replacement, etc. Each entry in physical memory cache directory 79 preferably represents one or more physical memory pages residing in physical memory cache 76. If there is a "miss" in physical memory cache 76 after a virtual memory access request for a page of data, the requested page of data is fetched from hard disk 104. Additional pages of data can also be fetched from hard disk 104 based on a predetermined algorithm or hints from the page request.

Storage controller 75 is configured to know where VPT 29 is located on hard disk 104, and can cache a portion of VPT 29 into physical memory cache 76 and cache a portion of that subset in a smaller dedicated VPT cache 39 in storage controller 75. Such a two-level VPT cache hierarchy prevents storage controller 75 from having to access physical memory cache 76 for the most-recently used VPT entries. It also prevents storage controller 75 from having to access hard disk 104 for a larger pool of recently-used VPT entries.

Figure 9:
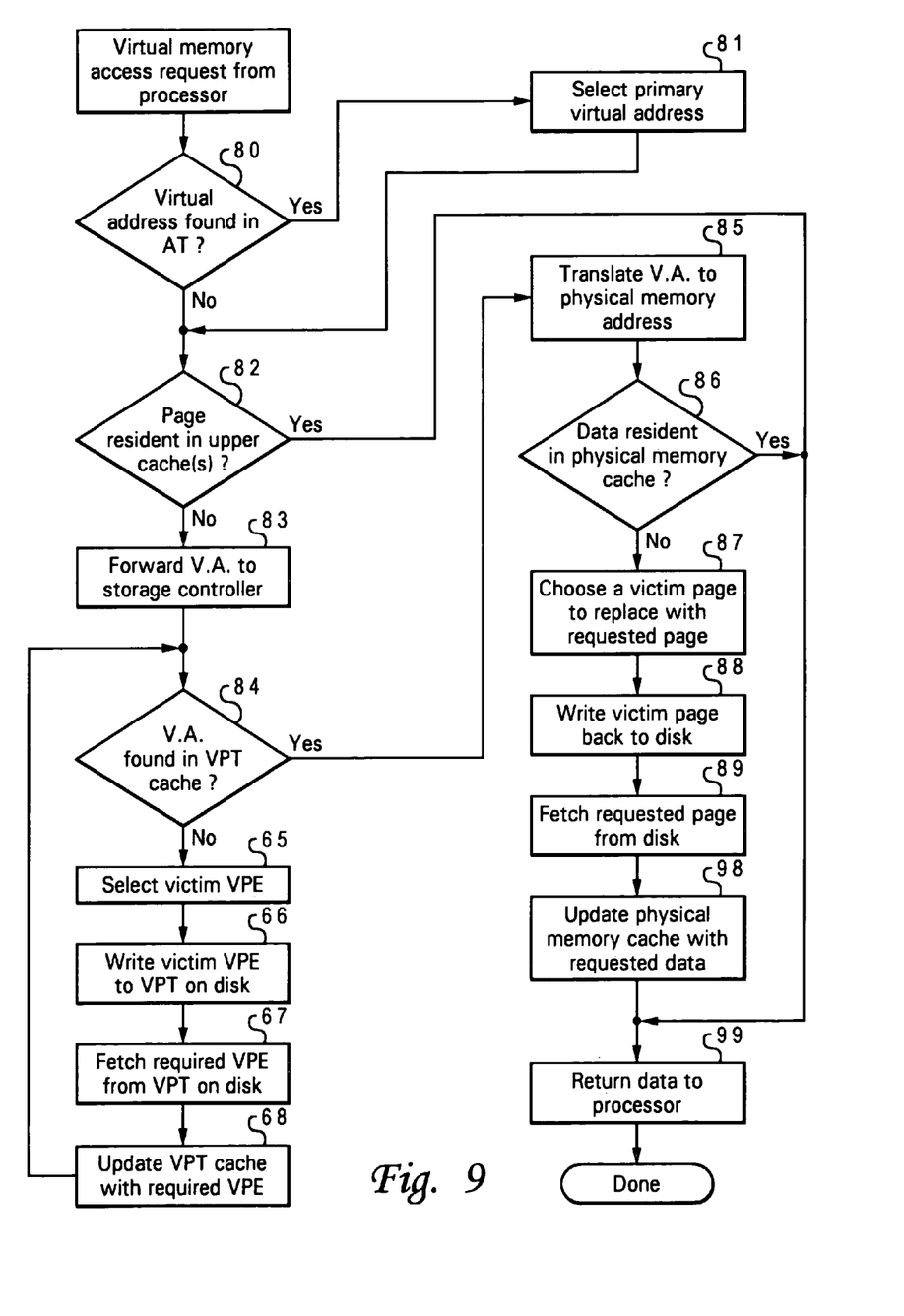
FIG. 9 is a high-level logic flow diagram of a method for handling a virtual memory access request from a processor within the multiprocessor data processing system in FIG. 7.

Referring now to FIG. 9, there is illustrated a high-level logic flow diagram of a method for handling an access request from a processor within multiprocessor data processing system 70, in accordance with a preferred embodiment of the present invention. In response to a virtual memory access request from a processor, a determination is made as to whether or not the requested virtual address from the access request is resident in an aliasing table associated with the processor, as shown in block 80. If the requested virtual address is resident in an aliasing table associated with the processor, then the primary virtual address is selected from the aliasing table associated with the processor, as depicted in block 81. Otherwise, if the requested virtual address is not resident in an aliasing table associated with the processor, the requested virtual address is passed on directly to the cache memory. Next, a determination is made as to whether or not the requested data from the access request is resident in a cache memory associated with the processor, as shown in block 82. If the requested data from the access request is resident in a cache memory associated with the processor, then the requested data is sent from the associated cache memory to the processor, as depicted in block 99. Otherwise, if the requested data is not resident in the cache memory associated with the processor, the virtual address of the requested data is forward to a storage controller, such as storage controller 75 from FIG. 7, as shown in block 83. A determination is then made as to whether or not the virtual page address of the requested data is resident in a VPT cache, such as VPT cache 39 from FIG. 7, as depicted in block 84.

If the virtual page address of the requested data is resident in a VPT cache, then the virtual address is translated to a corresponding physical address, as shown in block 85. A determination is then made as to whether or not the requested page is resident in a physical memory cache, such as physical memory cache 76 from FIG. 7, as depicted in block 86. If the requested page is resident in the physical memory cache, then the requested data is sent to the processor from the physical memory cache, as depicted in block 99. Otherwise, if the requested page is not resident in the physical memory cache, then a "victim" page is chosen within the physical memory cache to be replaced by the page of data containing the requested data, as shown in block 87. The "victim" page is then written back to a hard disk, such as hard disk 104 from FIG. 7, as depicted in block 88. The requested page of data is fetched from the hard disk, as shown in block 89. The physical memory cache is updated with the requested page of data, as depicted in block 98, and the request page of data is subsequently sent to the processor, as depicted in block 99.

If the virtual address of the requested page of data is not resident in the VPT cache, then a "victim" VPT entry (VPE) is chosen within the VPT cache, as shown in block 65. The "victim" VPE is then written back to the hard disk if it has been modified by the storage controller, as depicted in block 66. The required VPE is fetched from a VPT, such as VPT 29 from FIG. 7, within the hard disk, as shown in block 67. The VPT cache is updated with the required VPE, as depicted in block 68, and the process returns back to block 84.

IV. Storage Access Request Qualifiers

Figure 10:
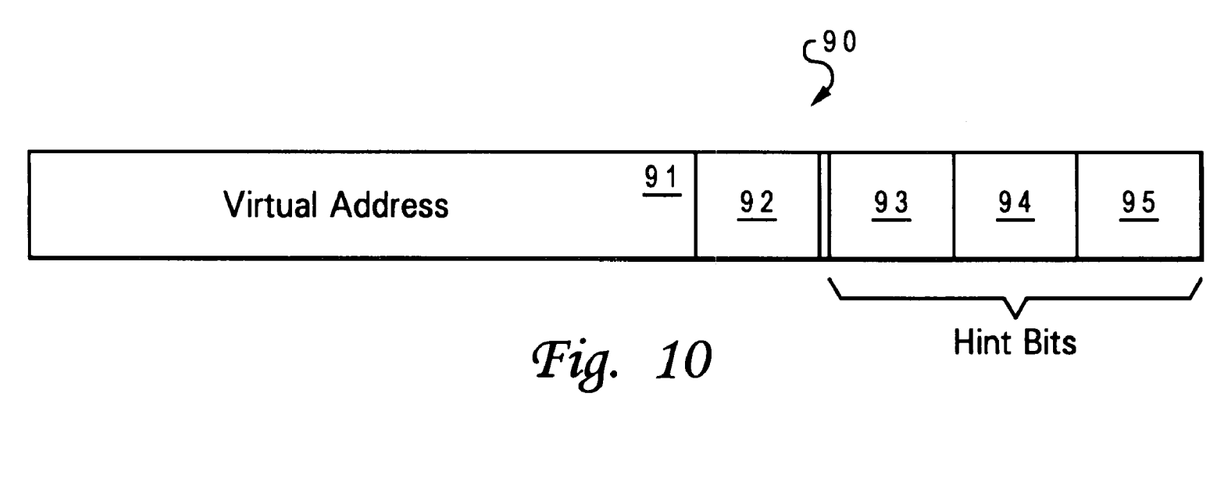
FIG. 10 is a block diagram of a virtual memory access request from a processor, in accordance with a preferred embodiment of the present invention.

With reference now to FIG. 10, there is illustrated a block diagram of a virtual memory access request format from a processor, in accordance with a preferred embodiment of the present invention. A virtual memory access request can be sent from a processor to a storage controller, such as storage controller 25 in FIG. 2, storage controller 45 in FIG. 4 or storage controller 75 in FIG. 7. As shown in FIG. 10, a virtual memory access request 90 includes five fields, namely a virtual address field 91, a not-deallocate field 92, a no-allocate field 93, a prefetch indicator field 94 and a number of pages to prefetch field 95. The values of fields 92–95 are programmable by user-level application software. This permits application software to communicate "hints" to the storage controller that manages the "virtualized" memory.

Virtual address field 91 contains the virtual address of the data or instructions requested by the processor. Not-deallocate field 92, which is preferably one bit wide, contains an indicator regarding whether or not the data should be deallocated from a physical memory cache, such as physical memory cache 25 from FIG. 2, physical memory cache 46 from FIG. 4 or physical memory 76 from FIG. 7. Each directory entry within the physical memory cache also has a not-deallocate bit similar to the bit in not-deallocate field 92. Access request 90 can be used to set or reset the not-deallocate bit within a directory entry of the physical memory cache. After receiving an access request from a processor for an address for the first time since power on, and if the bit in not-deallocate field 92 is set to a logical "1," a storage controller reads the requested data from a hard disk. The storage controller then writes the requested data to the physical memory cache, and sets the bit in the not-deallocate field when the storage controller updates the associated physical memory cache directory entry. On a subsequent "miss" in the physical memory cache, the cache replacement scheme of the storage controller checks the bit in the not-deallocate field in the directory entries of potential replacement candidates. Any potential victims having their bit in the not-deallocate field set to a logical "1" will be removed from consideration as a candidate for replacement. As a result, those cache lines with the bits in their corresponding not-deallocated field set to a logical "1" are forced to be held in the physical memory cache until a subsequent access to that cache line is received to reset the bit in the not-deallocate field of that cache line to a logical "0."

No-allocate field 93, a prefetch field 94 and a number of pages to prefetch field 95 are examples of optional hint bit fields. The hint bit fields allow a storage controller to perform certain operations, such as pre-fetching, after the requested data have been handled. No-allocate field 93 contains one bit to indicate whether the requested data is only needed once by the requesting processor such that the physical memory cache is not required to store the requested data. Prefetch field 94 contains one bit to indicate whether or not prefetching is needed. If the bit in prefetch field 94 is set, more data that are consecutively subsequent to the requested data will be pre-fetched. Number of pages field to prefetch 95 contains the number of pages that needed to be pre-fetched.

V. VPT Interrupts

In multiprocessor data processing system 70 of FIG. 7, when the required VPE is not resident in physical memory cache 76, or the requested physical page is not in physical memory cache 76, storage controller 75 has to access hard disk 104 to fetch the requested data and/or the VPE. Such access to hard disk 104 takes a much longer time than the access to physical memory cache 76. Since the application software process is not aware of a long access latency being incurred, it is beneficial for the operating system to be informed by storage controller 75 that a disk access is required to satisfy the data request so that the operating system can save the state of the current process and switch to a different process.

Storage controller 75 compiles a VPT interrupt packet after gathering information such as where the data requested by the requesting processor is located. Using the embodiment shown in FIG. 7 as an example, the storage areas of multiprocessor data processing system 70 can be divided into three zones, namely, zone 1, zone 2 and zone 3. Preferably, zone 1 includes all peer cache memories that are not associated with the requesting processor. For example, if the requesting processor is CPU 71a, then the peer cache memories include caches 72b–72n. Zone 2 includes all physical memory caches, such as physical memory cache 76 in FIG. 7. Zone 3 includes all physical memories, such as hard disk 29. The access time for the storage devices in zone 1 is approximately 100 ns, the access time for the storage devices in zone 2 is approximately 200 ns, the access time for the storage devices in zone 3 is approximately 1 ms or longer.

Once storage controller 75 has ascertained the zone location of the requested data, storage controller 75 compiles a VPT interrupt packet and sends it to the requesting processor. The requesting processor is known by its processor identification (ID) within a bus tag used to request the data.

Figure 11:
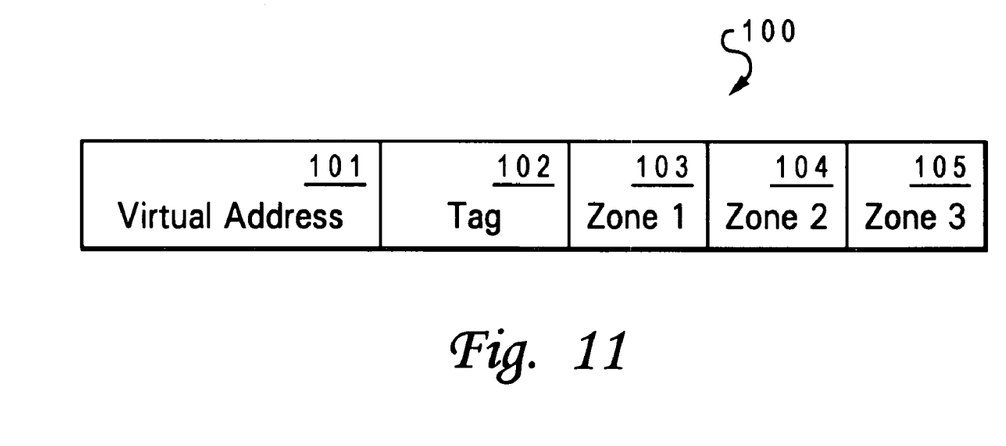
FIG. 11 is a block diagram of an interrupt packet to a requesting processor, in accordance with a preferred embodiment of the present invention.

Referring now to FIG. 11, there is depicted a block diagram of an interrupt packet to a requesting processor, in accordance with a preferred embodiment of the present invention. As shown, an interrupt packet 100 includes an address field 101, a tag field 102 and zone fields 103–105. Interrupt packet 100 is a special transaction type of the bus where address field 101 is the virtual address of the access request that caused the interrupt. Bus tag 102 is the same tag that was used for the access request that caused the interrupt. Each of zone fields 103–105 is preferably one bit long to denote the location of the requested data. For example, if the requested data is located in physical memory cache 76, the bit in zone 2 field 104 will be set while the bits in zone fields 103 and 105 are not set. Similarly, if the requested data is located in hard disk 104, the bit in zone 3 field 105 will be set while the bits in zone fields 103 and 104 are not set. As such, the requesting processor can identify the interrupt packet and find out the location of the requested data.

After receiving a VPT interrupt packet, the requesting processor compares the virtual address in the VPT interrupt packet with the virtual address of all outstanding load/store operations. If a match is found, then the processor has the option of generating an interrupt to save the state of the current process and to switch to another process while the requested VPE entry and/or the associated page of data is being brought in from hard disk 104.

For a more elaborate implementation, each of CPUs 71*a*–71*n* includes a set of zone slots. For example, in FIG. 7, CPU 71*a* includes a zone slots set 5*a*, CPU 71*b* includes a zone slots set 5*b*, and CPU 71*n* includes a zone slots set 5*n*. The number of zone slots in each zone slots set should correspond to the number of the previously defined zone fields in an interrupt packet. For example, interrupt packet 100 has three zone fields, which means each of zone slots sets 5*a*–5*n* has three corresponding zone slots. After receiving an interrupt packet, such as interrupt packet 100, the requesting processors then set a corresponding zone slot with a time stamp. For example, after receiving interrupt packet 100, which is intended for CPU 71*b*, having the bit in zone field 105 set, CPU 71*b* then set the third zone slot of zone slots set 5*b* with a time stamp. As such, CPU 71*b* is aware of the requested data that is stored on hard disk 104. At this point, CPU 71*b* can compare the time stamp information and the current processing information in order to decide whether to wait for the requested data or to save the state of the current process and to switch to another process while the requested VPE entry and/or the associated page of data is being brought in from hard disk 104 because it will take approximately 1 ms before the requested data will be available. Such time comparison can be performed again by CPU 72*b* after the another process is completed before the requested data is available in order to make another decision.

As has been described, the present invention provides a method for improving a prior art data processing system capable of utilizing a virtual memory processing scheme. Advantages of the present invention include the elimination of hashing for direct attached storage. If no virtual-to-real address translations are required in the processor, accesses to the upper levels of cache memories can be faster. If no virtual-to-real address translations occur in the processor, the processor implementation is simpler because less silicon area and less power consumption are needed. With the present invention, the cache line size of the physical memory cache and even the page size is not visible to the operating system.

The present invention also solves the problems associated with the management of virtual memories by the Virtual Memory Manager (VMM) of the operating system. The PFT (as defined in prior art) does not exist in the data processing system of the present invention. As such, the VMM of the operating system can be significantly simplified or eliminated entirely.

While the invention has been particularly shown and described with reference to a preferred embodiment, it will be understood by those skilled in the art that various changes in form and detail may be made therein without departing from the spirit and scope of the invention.

What is claimed is:

1. A data processing system capable of utilizing a virtual memory processing scheme, said data processing system comprising:

a plurality of processing units, wherein said plurality of processing units have volatile cache memoryies operating in a virtual address space;

an interconnect coupled to said plurality of processing units and volatile cache memories;

a non-volatile physical storage device coupled to said plurality of processing units via said interconnect, wherein said virtual address space of said plurality of processing units directly maps to a physical disk address space of said non-volatile physical storage device; and a storage controller coupled to said interconnect for directly mapping a virtual address from one of said volatile cache memories to a physical disk address directed to a storage location within said non-volatile physical storage device without transitioning through an intermediate translation.

2. The data processing system of claim 1, wherein said non-volatile physical storage device is a hard disk.

3. The data processing system of claim 2, wherein said bard disk is coupled to said interconnect via an input/output channel converter.

4. The data processing system of claim 3, wherein said hard disk is coupled to said input/output channel converter via an adapter.

* * * * *